United States Patent
Wang

(10) Patent No.: US 11,112,313 B2
(45) Date of Patent: Sep. 7, 2021

(54) SENSOR AND AUTOMATIC CALIBRATION METHOD APPLIED THERETO

(71) Applicant: EmCom Technology Inc., Taipei (TW)

(72) Inventor: Chu-Li Wang, Taipei (TW)

(73) Assignee: Emcom Technology Inc., Taipei (TW)

( * ) Notice: Subject to any disclaimer, the term of this patent is extended or adjusted under 35 U.S.C. 154(b) by 0 days.

(21) Appl. No.: 16/415,731

(22) Filed: May 17, 2019

(65) Prior Publication Data
US 2019/0353526 A1   Nov. 21, 2019

(30) Foreign Application Priority Data
May 18, 2018   (CN) ......................... 201810480120.4

(51) Int. Cl.
| | |
|---|---|
| G01J 5/00 | (2006.01) |
| G01P 1/02 | (2006.01) |
| G01N 21/27 | (2006.01) |
| G01P 21/00 | (2006.01) |
| G01J 5/08 | (2006.01) |
| G06F 3/01 | (2006.01) |
| G08B 13/191 | (2006.01) |
| G01J 5/06 | (2006.01) |

(52) U.S. Cl.
CPC ........... *G01J 5/0025* (2013.01); *G01J 5/0806* (2013.01); *G01N 21/274* (2013.01); *G01P 1/02* (2013.01); *G01P 21/00* (2013.01); *G06F 3/011* (2013.01); *G08B 13/191* (2013.01); *G01J 2005/067* (2013.01)

(58) Field of Classification Search
CPC .. G01J 5/0025; G01J 5/0806; G01J 2005/067; G01N 21/274; G01P 1/02; G01P 21/00; G06F 3/011; G08B 13/191
See application file for complete search history.

(56) References Cited

U.S. PATENT DOCUMENTS

| | | | | |
|---|---|---|---|---|
| 4,389,706 A | * | 6/1983 | Gomola | G05B 21/02 700/1 |
| 5,317,620 A | * | 5/1994 | Smith | H04M 11/04 340/567 |
| 5,699,243 A | * | 12/1997 | Eckel | H05B 47/105 700/17 |
| 6,151,529 A | * | 11/2000 | Batko | H01H 47/007 700/28 |
| 7,486,386 B1 | * | 2/2009 | Holcombe | G01S 7/497 356/4.01 |
| 9,817,402 B1 | * | 11/2017 | Ayyagari | G05D 1/0212 |
| 2003/0165091 A1 | * | 9/2003 | Kadlec | G11B 7/08541 369/44.28 |

(Continued)

FOREIGN PATENT DOCUMENTS

EP   3168711 A1   5/2017

*Primary Examiner* — Blake C Riddick
(74) *Attorney, Agent, or Firm* — Muncy, Geissler, Olds & Lowe, P.C.

(57) ABSTRACT

The present invention discloses an automatic calibration method of a sensor, including the following steps of: (A1) setting a default trigger value; (A2) sampling a signal and accumulating a signal value to perform signal judgment; (A3) determining whether a trigger condition is met or not; (A4) if yes, recording an accumulated signal value meeting the trigger condition, and if not, returning to step (A2); and (A5) analyzing and updating the default trigger value.

4 Claims, 6 Drawing Sheets

(56) References Cited

U.S. PATENT DOCUMENTS

| | | | |
|---|---|---|---|
| 2003/0221324 A1* | 12/2003 | Myron | H05B 47/105 33/286 |
| 2005/0209828 A1* | 9/2005 | Blosser | G06F 3/013 702/190 |
| 2007/0040676 A1* | 2/2007 | Bandringa | G08B 29/22 340/567 |
| 2007/0177384 A1* | 8/2007 | Sibalich | F21V 23/0442 362/276 |
| 2007/0273539 A1* | 11/2007 | Gananathan | H05B 47/11 340/615 |
| 2010/0237248 A1* | 9/2010 | Walters | G08B 13/193 250/340 |
| 2013/0003146 A1* | 1/2013 | Chu | H04N 1/46 358/504 |
| 2013/0121367 A1* | 5/2013 | Ahuja | G06F 15/00 374/1 |
| 2015/0039922 A1* | 2/2015 | Chalhoub | G06F 1/3228 713/323 |
| 2015/0097789 A1* | 4/2015 | Hsu | G01N 21/94 345/173 |
| 2016/0014404 A1* | 1/2016 | Krestyannikov | G02B 7/38 348/187 |
| 2016/0104741 A1* | 4/2016 | Enichlmair | H01L 31/02325 257/49 |
| 2016/0179103 A1* | 6/2016 | Paradis | F01D 17/10 137/78.1 |
| 2016/0334076 A1* | 11/2016 | Dong | F21V 7/0008 |
| 2016/0338212 A1* | 11/2016 | Schmidt | H05K 5/0226 |
| 2016/0345447 A1* | 11/2016 | Kraz | F16B 21/02 |
| 2018/0106897 A1* | 4/2018 | Shouldice | G01S 13/88 |
| 2018/0348841 A1* | 12/2018 | Mehrl | G06F 1/3231 |
| 2018/0356256 A1* | 12/2018 | Mirassou | G01D 5/24471 |
| 2019/0226915 A1* | 7/2019 | Zhang | G01J 5/10 |
| 2019/0259257 A1* | 8/2019 | Morita | G08B 13/193 |
| 2019/0289698 A1* | 9/2019 | Rozendaal | G08C 17/02 |

* cited by examiner

SENSOR AND AUTOMATIC CALIBRATION METHOD APPLIED THERETO

BACKGROUND

Technical Field

The present invention relates to an automatic calibration method of a sensor. Specifically, the present invention relates to an automatic calibration method of a human motion sensor.

Related Art

In recent years, due to rising of environmental awareness for energy saving and carbon reducing, automatic control for operation of the equipment in specific region such as automatic lighting, an entrance guard switch and the like according to an environment condition or a specific condition in real time at home or a public space has become an important developing tendency for intelligent energy saving.

Generally speaking, an object motion sensor is built in or connected with the above-mentioned equipment. Before installing, various setting must be manually adjusted, such as parameters of brightness, a sensing distance and time. However, not all users clearly know about how to perform setting. Moreover, even if manual adjusting is performed, requirements of the user may not be definitely met. In addition, once installing of the equipment is completed, it is troublesome for the user to perform adjusting operation.

SUMMARY

On this account the present invention is directed to provide an automatic calibration method of a sensor, and particularly refers to an automatic calibration method of a human body sensor. Based on the design procedure of the present invention, the sensor is enabled to have a self-learning function. Accordingly, time-consuming and complicated manual adjusting operation may be effectively omitted.

The automatic calibration method comprises the following steps: (A1) setting a default trigger value (in some embodiments, the default trigger value comprises environment factor noise); (A2) sampling a signal and accumulating a signal value to perform signal judgment; (A3) determining whether a trigger condition is met or not; (A4) if yes, recording an accumulated signal value meeting the trigger condition, and if not, directly going back to step (A2); and (A5) analyzing and updating the default trigger value.

The present invention is otherwise directed to provide an automatic calibration method of a sensor, and particularly refers to an automatic calibration method of a human body sensor. Based on the design procedure of the present invention, the sensor is enabled to have a self-learning function. Accordingly, time-consuming and complicated manual adjusting operation may be effectively omitted.

The present invention is further directed to provide a sensor with the built-in above-mentioned automatic calibration method. The sensor includes a bottom, a sensing unit, a middle cover, a lens, a mask and an outer cover. One side of the bottom is provided with a connection end portion and a wire inlet connected with the connection end portion. The sensing unit is electrically connected with the connection end portion. The middle cover is arranged on one side of the sensing unit opposite to the bottom. The lens is arranged on one side of the middle cover opposite to the bottom and the sensing unit is covered with the lens. The lens is covered with the mask and part of the lens is exposed. The outer cover is arranged on one side of the mask opposite to the bottom.

The above-mentioned automatic calibration method is built in the sensing unit.

Additional characteristics and beneficial effects of the present invention will be illustrated in following description to be more obvious, or will be learned by means of the practice of the present invention. Other objectives and beneficial effects of the present invention may be achieved or accomplished from the description, the claims and the attached figures of the present application.

DETAILED DESCRIPTION

Figure 1A:
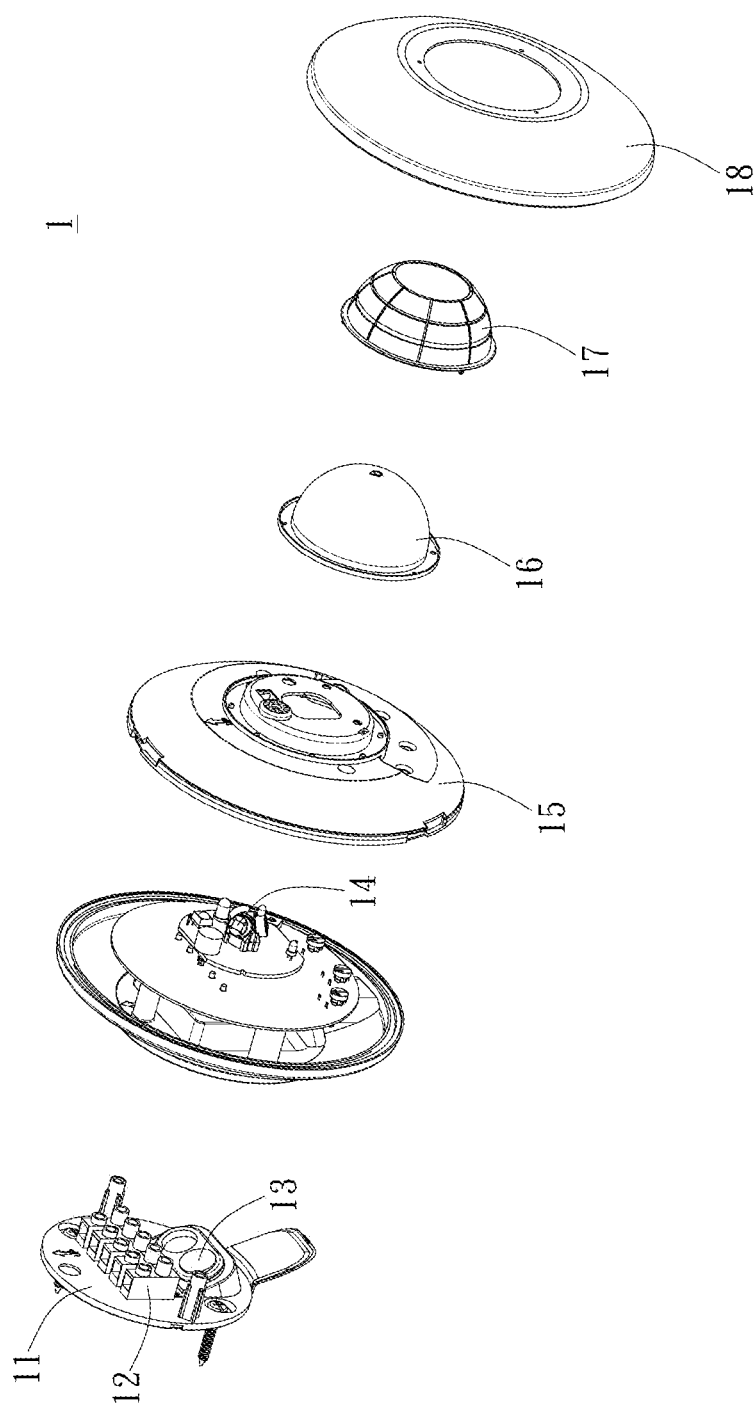
FIG. 1A and FIG. 1B are an exploded view and a three-dimensional view of an embodiment of a sensor of the present invention.

A plurality of embodiments of the present invention will be disclosed below through description in connection with the drawings, and for the purpose of clear illustration, many details in practice will be illustrated together in the following narration. However, it is to be understood that, the details in the practice should not be used to limit the present invention. In addition, for the purpose of simplifying the drawings, some conventional known structures and assemblies are drawn out in a simple schematic manner in the drawings.

The present invention is an automatic calibration method of a sensor, and is preferably applied to a human motion sensor, such as a Pyroelectric Infrared Radiation Detector (PIR), but is not limited herein. In other embodiments, the present invention may be also applied to other similar sensors, which shall fall within the scope of the present invention as long as the purpose thereof is to further control equipment through objecting motion detection.

Figure 1B:
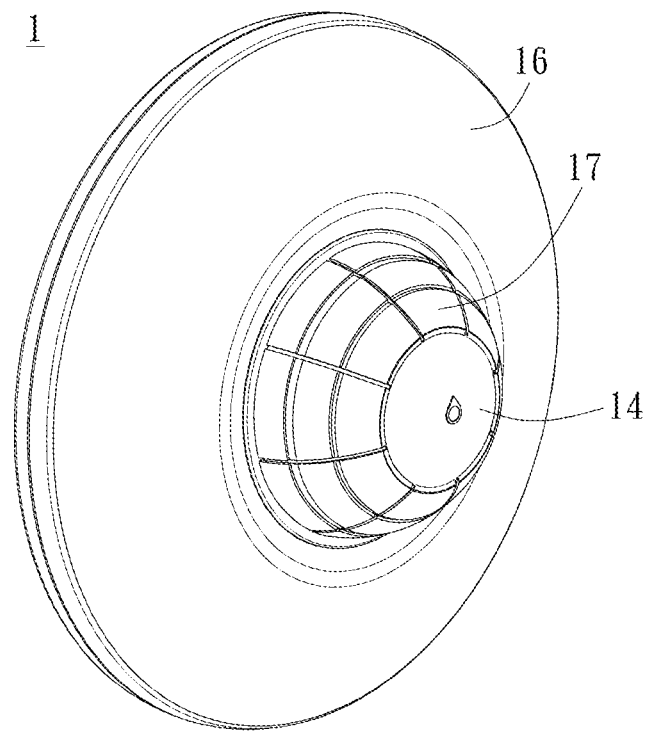

Referring to FIG. 1A and FIG. 1B, a sensor 1 of an embodiment is illustrated. This embodiment takes the Pyroelectric Infrared Radiation Detector (PIR) as an example, but the present invention is not limited herein. The sensor 1 is provided with a bottom 11, a connection end portion 12, a wire inlet 13, a sensing unit 14, a middle cover 15, a lens 16, a mask 17 and an outer cover 18. The connection end portion 12 and the wire inlet 13 are arranged on the bottom 11, and are provided for setting electrical connection with other controlled equipment (such as lighting equipment, an entrance guard switch, monitoring equipment and an electric appliance automatic control system). The sensing unit 14 is the Pyroelectric Infrared Radiation Detector (PIR), and is electrically connected with the connection end portion 12. The middle cover 15 is arranged on one side of the sensing unit 14 opposite to the bottom 11. The lens 16 is arranged on one side of the middle cover 15 opposite to the bottom 11 and the sensing unit 14 is covered with the lens 16. The lens 16 is mainly used for focusing the sensing light and dividing a sensing area (in an embodiment, it is divided into a bright area and a dark area). The mask 17 is arranged on one side of the lens 16 opposite to the bottom 11, and the lens 16 is covered with the mask 17. In addition, the mask 17 is used for focusing the sensing light, and a part of the lens 16 is not shielded by the mask 17. The mask 17 is provided with a plurality of foldable lines to be broken off by a user himself/herself, and the user can break off part of the mask 17 according to the requirement of different sensing ranges. The outer cover 18 is arranged on one side of the mask 17 opposite to the bottom 11. Those skilled in the art should know its composition and principle.

Figure 2:
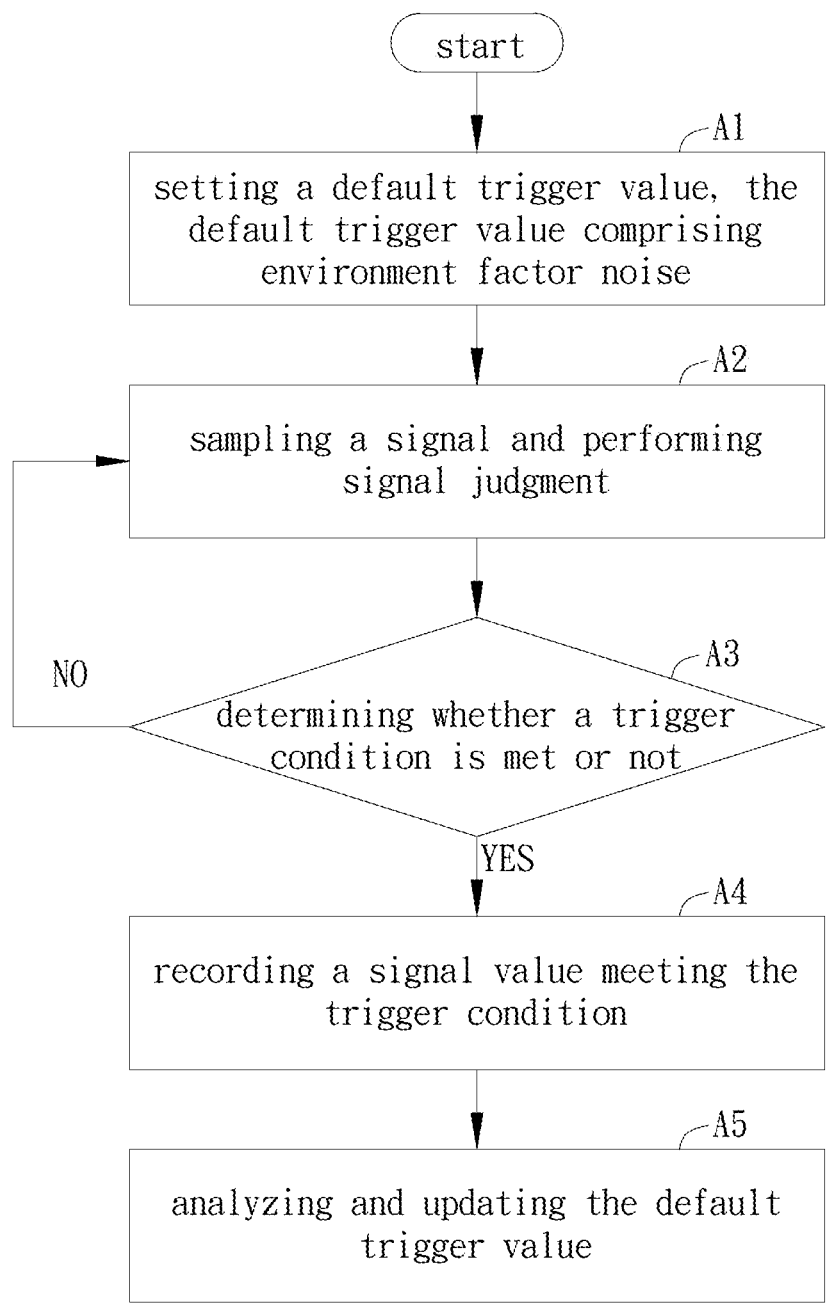
FIG. 2 is a flow chart of an embodiment of an automatic calibration method of the present invention.
Figure 3A:
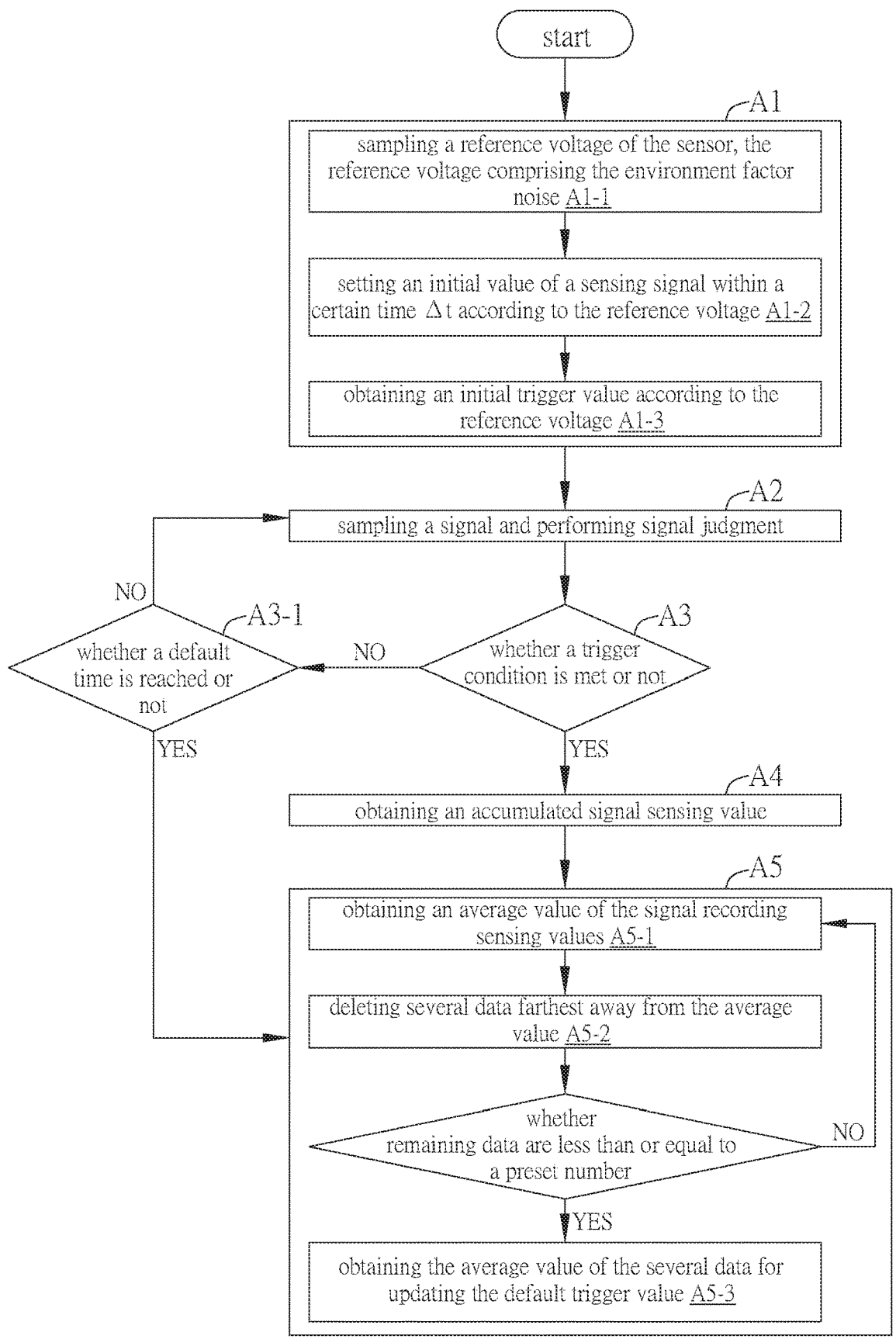
FIG. 3A is a flow chart of an embodiment based on the embodiment of FIG. 2.

Regarding to the automatic calibration method of the present invention, please refer to flow charts of embodiments of FIG. 2 and FIG. 3A. The procedure of this embodiment and its defined equation/algorithm can be written into the above sensing unit 14 (such as an arithmetic unit on a control circuit board (not shown in the figures) connected with the sensing unit 14) in a manner of software or firmware, so as to control the controlled equipment.

The automatic calibration method preferably includes the following steps: (A1) setting a default trigger value; (A2) sampling a signal and accumulating a signal value to perform signal judgment; (A3) determining whether a trigger condition is met or not; (A4) if yes, recording an accumulated signal value meeting the trigger condition, and if not, going back to step (A2); and (A5) analyzing and updating the default trigger value.

Step (A1) of setting the default trigger value is preferably executed when the sensor 1 is in a warming-up state. Specifically speaking, when the sensor 1 is turned on, that is, after the sensing unit 14 is powered on and stably functions (such as I/O input and output), a step (A1-1) of sampling a reference voltage V1 of the sensing unit is executed. Then a step (A1-2) of setting an initial environment sensing signal value S1 obtained by the sensor in the warming-up state according to the reference voltage V1 and circuit design within a certain time ($\Delta t$, this embodiment takes 100-250 ms as an example, but is not limited herein) is executed. Specifically speaking, $S_1$ can be defined as the following equation: $S_1 = \int |(V-V1)| dt$. Herein, V is a single point voltage obtained from the sensing unit within the time of $\Delta t$.

It should be noted that the reference voltage is related to environment factors. It is mainly set for adapting to an operating environment and an installing manner. Thus, its value is varied based on different operating environments and installing manners. The installing manner is roughly divided into an in-wall type, a wall-mount type and a ceiling type, but is not limited herein.

Step (A1-3) of obtaining an initial trigger value $S_2$ according to the reference voltage V1 is subsequently executed. The equation is shown as follows: $S_2 = S_1 + S_{def}$, wherein $S_{def}$ is a default trigger experience value. $S_{def}$ has different experience values according to different equipment. In the warming-up state, a default trigger value $S_{win} = S_2$ is defined through the above procedure. In this embodiment, the default trigger value is regarded as the highest sensitivity of the sensor 1.

Figure 3B:
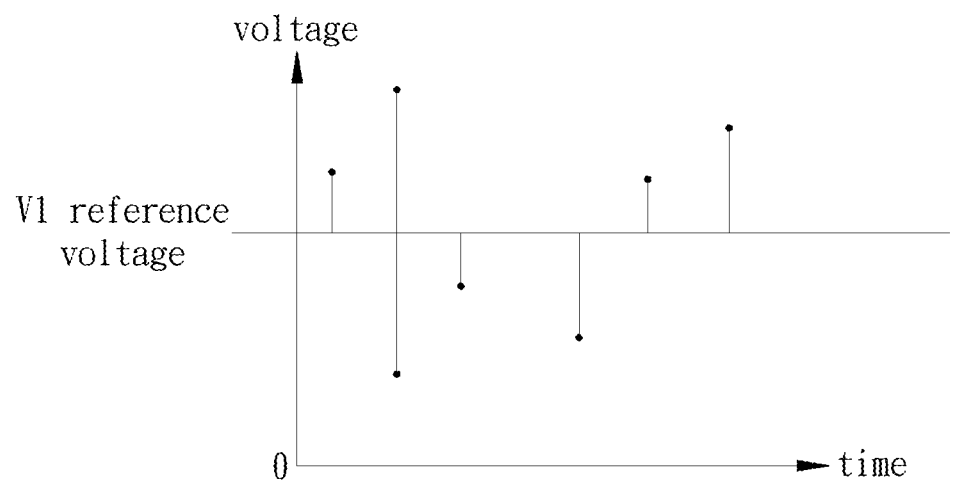
FIG. 3B, FIG. 3C and FIG. 3D are schematic views of the embodiment of FIG. 3A.

After warming-up is completed, stages of human motion detection and self-learning start to be executed. Step (A2) of sampling the signal and accumulating the signal value to perform signal judgment is executed. In an embodiment, sampling is performed at set intervals. In an embodiment, n (in an embodiment n=150) points are sampled at the time interval of $\Delta t$ (such as at the interval of 100-250 ms), an equation is therefore listed as follows: $S_t = \int |(V-V1)| dt$. Herein, V is a single point voltage obtained from the sensing unit within the time of $\Delta t$, as shown in FIG. 3B.

Figure 3C:
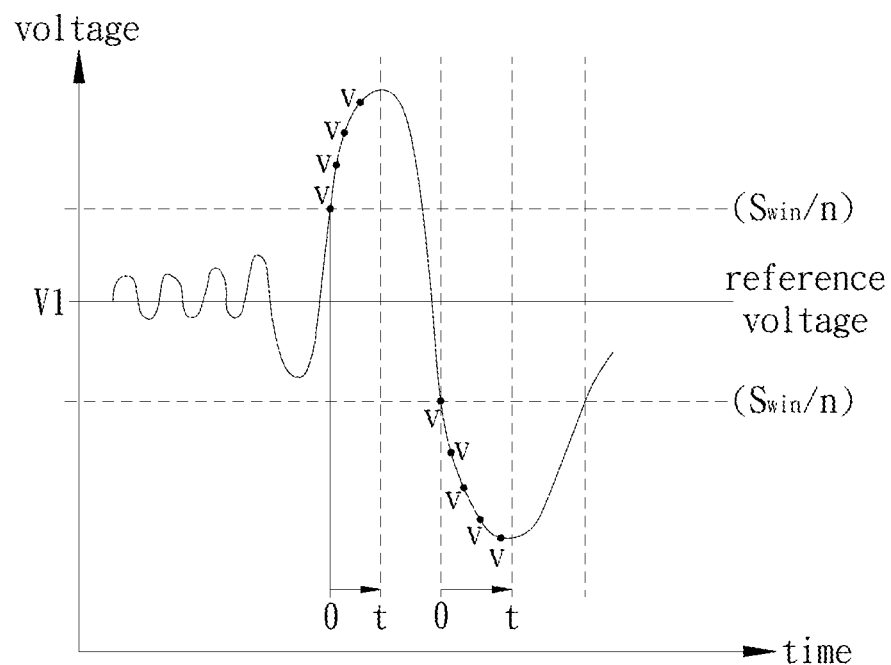

After signal sampling is completed, step (A3) of determining whether the trigger condition is met or not is executed. If the trigger condition is met, step (A4) of recording the accumulated signal value meeting the trigger condition is carried out: $S_t = \int |(V-V1)| dt \geq V1 \cdot t$. As shown in FIG. 3C, when the signal exceeds the default trigger value ($S_{win}$), triggering is judged, and the system performs operation according to the above algorithm. It should be noted that in order to avoid that non-triggered data (namely a region between $S_{win}$ and $V1 \cdot n$) are incorporated into calculation, a limiting condition, namely $\geq V1 \cdot n$, is needed during calculation.

Specifically speaking, the signal value meeting the trigger condition is recorded as the obtained accumulated signal sensing value. In an embodiment, P positions are sampled in total (for examples, 3 positions, 5 positions and 10 positions are sampled), and the accumulated signal value is $S_p = \Sigma_{i=1}^{P} S_t$.

According to the above, step (A5) of analyzing and updating the default trigger value is subsequently executed. Specifically speaking, successful triggering is performed for $N_1$ times (For example, 10 times, but the present invention is not limited thereto) within certain time. Under an actual condition, it is regarded as that the sensor detects an object within a sensing range and be triggered for $N_1$ times within the certain time.

The detailed process is as follows, step (A5-1) of obtaining an average value of signal recording sensing values is executed. In an embodiment, $N_1$ times of triggering is performed within $T_{m1}$ time, its sum is calculated, the average value is obtained, and herein it is defined as $S_{N_1} = \Sigma_{t=1}^{N_1} S_t$, $S_{avg} = (S_{N_1}/N_1)$.

Step (A5-2) of deleting several data relatively away from the average value is performed. It is mainly made for analysis and correction with respect to the sensing distance. In an embodiment, $K_1$ data relatively away from the average value $S_{avg}$ are deleted from $S = \{S_1, S_2, S_3 \ldots, S_{N_1}\}$, and $M_1$ data remain. The purpose is to filter out relatively far deviated distance values obtained from the sensor during sensing, so as to lower a misjudgment rate. Besides, $S_{avg}$ needs to be calculated again when the data are filtered each time, that is, $K_1$ data are filtered out each time, and $M_1$ data remain. As described above, the cyclic filtering continues in this way. When finally remaining $M_1$ data are less than or equal to $K_{min}$, the sensing value $S_{adj}$ after distance is corrected is obtained, wherein $K_{min}$ is minimum data remaining after data filtering. The equation is defined as follows:

$$S_{adj} = \begin{cases} (S_{K_1}/K_1), & M_1 \geq K_1, K_1 \geq K_{min} \\ (S_{win}), & K_1 < K_{min}, S_{avg} \leq S_{win} \end{cases}.$$

Figure 3D:
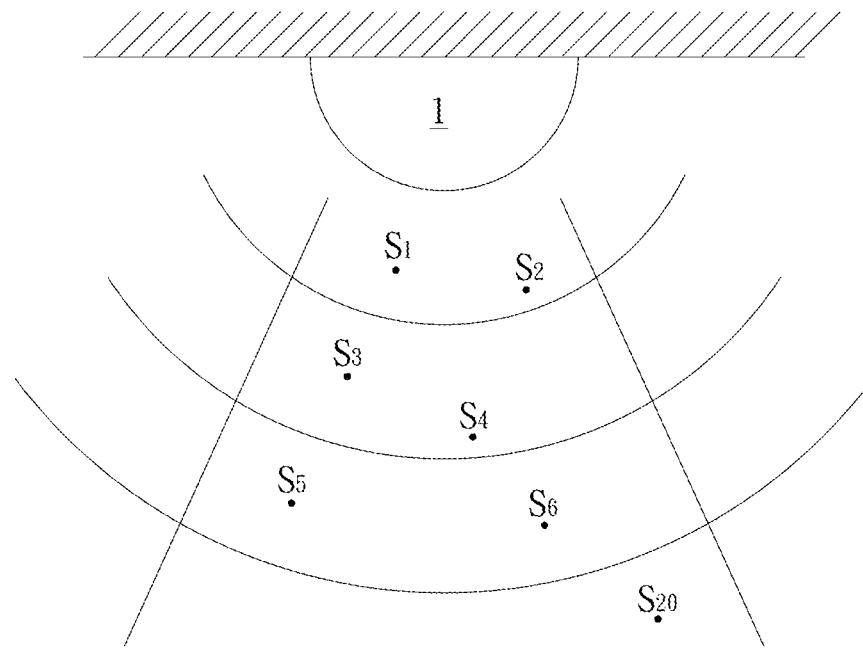
Figure 3D:
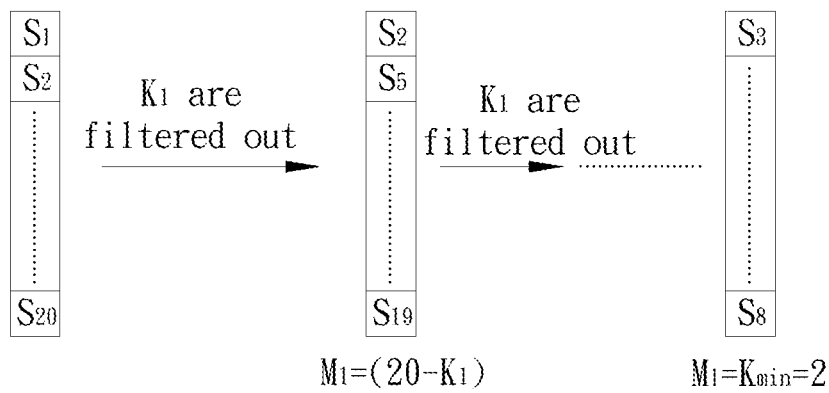

For step (A5-2) of deleting several data relatively away from the average value, reference can be made in combination with FIG. 3D. In an embodiment, it is currently detected that 20 data are stored in a data set S, ($S_1$-$S_{20}$) are contained in S, and $M_1 = 20-K_1$ data remain after $K_1 = 6$ data are filtered out (deleted), namely $M_1 = 14$ data are the closest to the average value. 6 (14→8→2) data is continuously filtered till $M_1 = 2$ (that is, $K_1 \geq K_{min} = 2$) data (taking $S_3$ and $S_8$ as examples) are the closest to the average value. In addition, assuming that the system currently senses that another data value $S_{21}$ is closer to $S_{avg}$ relative to $S_3$, the system automatically excludes $S_3$ data and incorporate $S_{21}$. At the moment, $S_{avg}$ also correspondingly changes, for example, $S_{avg}$ changes into $S_{avg2}$. Then the closest $K_{min}$ data in substantial real time is obtained.

Through the above equation, step (A5-3) of updating the default trigger value is performed. The trigger value after being updated is defined as $S_{win}=S_{adj}$.

It should be noted that in step (A3), if it is judged that the trigger condition is not met, it continues to judge whether triggering is still not occurred continuously when a default time is reached (namely, the step A3-1). If yes, step (A5) is performed; if not, the process is back to the step (A2).

According to another embodiment of the present invention, under the actual condition, a user leaves after installing of the sensor 1 is completed. That is, the sensor 1 cannot meet $N_1$ times of triggering within above $T_{m1}$ time. However, even if the user leaves, the sensor 1 must still keep its functions. Thus, the sensing unit 14 continuously runs at the highest sensitivity and the following procedure is performed.

If it is judged that the trigger condition is met, like the above-mentioned embodiment, step (A5-1) of obtaining the average value of the signal recording sensing values is performed. Due to the fact that triggering times within $T_{m1}$ time are less than $N_1$ times in this situation, $N_2$ is taken as an example (that is, $N_2<N_1$) in this embodiment. Thus, the equation is defined as $S_{N_2}=\Sigma_{t=1}^{N_2} S_t$; $S_{avg}=(S_{N_2}/N_2)$.

Then step (A5-2) of deleting several data relatively away from the average value is then performed. It is made mainly for analysis and correction with respect to the sensing distance. In an embodiment, $K_2$ data relatively away from the average value $S_{avg}$ are flited out from $S=\{S_1, S_2, S_3 \ldots, S_{N_2}\}$, and $M_2$ data remain. The purpose is to filter out relatively far deviated distance values obtained from the sensor during sensing, so as to lower the misjudgment rate. $K_2$ data are filtered out each time, and $M_2$ data remain. Cyclic filtering continues in this way. When finally remaining $M_2$ data are less than or equal to $K_{min}$, the sensing value $S_{adj}$ after the distance is corrected is obtained, wherein $K_{min}$ is minimum data remaining after data filtering. The equation is defined as follows:

$$S_{adj} = \begin{cases} (S_{K_2}/K_2), & M_2 \geq K_2, K_2 \geq K_{min} \\ (S_{win}), & N_2=0 \text{ or } K_2 < K_{min}, S_{avg} \leq S_{win} \end{cases}.$$

For step (A5-2) of deleting several data relatively away from the average value, reference can also be made to FIG. 3D, and the details are not repeated herein.

Through the above equations, step (A5-3) of obtaining the average value of the several data for updating the default trigger value is performed. Similarly, the trigger value after being updated is defined as $S_{win}=S_{adj}$.

Compared with the prior art, the automatic calibration method of the sensor of the present invention can enable the sensor to have the self-learning function, self-calibration is continuously performed, such that the time-consuming and complicated manual adjusting operation can be effectively omitted.

REFERENCE NUMERALS

| | | | |
|---|---|---|---|
| 1 | sensor | 11 | bottom |
| 12 | connection end portion | 13 | wire inlet |
| 14 | sensing unit | 15 | middle cover |
| 16 | lens | 17 | mask |
| 18 | outer cover | | |

What is claimed is:

1. An automatic calibration method for correcting sensing distance of a sensor, comprising the following steps:
    (A1) setting a default trigger value, the default trigger value comprising environment factor noise;
    (A2) sampling a signal and accumulating a signal value to perform signal judgment from a plurality of positions;
    (A3) determining whether a trigger condition is met or not for every signal value from the plurality of position;
    (A4) if yes, recording an accumulated signal value meeting the trigger condition, and if not, going back to step (A2); and
    (A5) analyzing and updating the default trigger value by obtaining an average value and filtering out relatively far deviated distance signal values away from the average value for the plurality of positions, wherein the step (A5) further comprises the following steps:
    (A5-1) obtaining the average value of the signal recording sensing values meeting the trigger condition;
    (A5-2) deleting several data farthest away from the average value and obtaining a corresponding new average value from the remaining data repeatedly and continuously until a preset number data of different positions are left for calibrating an updated average value, wherein the remaining data for calculating the corresponding new average value and deleting several data farthest away from the corresponding new average value is gradually reduced in this process; and
    (A5-3) obtaining the updated average value of the preset number data of different positions for updating the default trigger value.

2. The automatic calibration method according to claim 1, wherein the step (A1) further comprises the following steps:
    (A1-1) sampling a reference voltage of the sensor, the reference voltage comprising the environment factor noise;
    (A1-2) setting an initial value of a sensing signal within a certain time Δt according to the reference voltage; and
    (A1-3) obtaining an initial trigger value according to the reference voltage.

3. The automatic calibration method according to claim 1, wherein if the step (A3) is judged as not, the following step is performed:
    (A3-1) judging whether a default time is reached or not; and if yes, performing step (A5), and if not, going back to step (A2).

4. A sensor, comprising:
    a bottom, one side of the bottom being provided with a connection end and a wire inlet connected with the connection end for setting electrical connection with other controlled equipment;
    a sensing unit, electrically connected with the connection end;
    a middle cover, arranged on one side of the sensing unit opposite to the bottom;
    a lens, arranged on one side of the middle cover opposite to the bottom, and covering the sensing unit;
    a mask, covering the lens and exposing part of the lens; and
    an outer cover, arranged on one side of the mask opposite to the bottom, wherein the sensing unit is configured to perform the automatic calibration method according to claim 1.

* * * * *